UNITED STATES PATENT OFFICE.

ALBRECHT SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF BROMINATING INDIGO.

No. 807,782.     Specification of Letters Patent.     Patented Dec. 19, 1905.

Application filed October 17, 1902. Serial No. 127,722.

*To all whom it may concern:*

Be it known that I, ALBRECHT SCHMIDT, Ph. D., a citizen of the Empire of Germany, residing at Höchst-on-the-Main, Germany, have invented certain new and useful Improvements in the Manufacture of Bromo-Substitution Products of Indigo, of which the following is a specification.

According to the German Patent No. 12,875 indigo can be brominated only in the absence of water. In fact, large quantities of bromo-isatin are obtained if an aqueous indigo paste of twenty-per-cent. strength is brought together with bromin, as already observed by Erdmann.

I have found that indigo may also be brominated even in the presence of water if the action of bromin on indigo occurs in the presence of inorganic acids—especially, for instance, with sulfuric, hydrochloric, hydrobromic, or fluoric acids. The quantity and strength of these acids, however, has to be controlled to avoid as much as possible any formation of bromo-isatin. I have found that by employing certain concentrations varying according to the choice of the inorganic acids the bromination will occur smoothly—that is to say, without or with hardly any formation of bromo-isatin. If a lower degree of concentration is used, the yield of bromo-indigo decreases, whereas the bromo-isatin increases. In the case of hydrobromic acid instead of adding it at the beginning it may also be allowed to form during the process of substitution by brominating indigo in water. Of course it is necessary here to use only little water—for instance, instead of an indigo paste of twenty-per-cent. strength indigo moistened only with twenty to fifty per cent. of water—for otherwise the hydrogen bromid formed during the process of substitution would not suffice to produce at the beginning the more concentrated hydrobromic acid favorable for bromination. The same holds good if dilute inorganic acids are used, which when employed in great quantities do not produce a favorable result of bromination; but when used, as in the case with little water, preferably in the presence of solid or liquid indifferent diluents, a very good product of bromination may yet be arrived at.

According to the quantity of bromin employed more or less highly brominated products may be obtained. It is best not to exceed the quantity of bromin of four atoms, so that a di-product of substitution may be obtained; but the less brominated products (calculated, for instance, to monobromo-indigo) are also very valuable and even higher than di-brominated products may be employed. As inorganic acids are to be considered in the first place sulfuric, hydrochloric, hydrobromic, and fluoric acids, phosphoric acid is only suitable if the operation is carried on with very little water. Its action is inferior to that, for example, of sulfuric or hydrobromic acid. Also acid inorganic salts may be employed in the latter sense. The usual carriers may be added during bromination. The following examples illustrate the bromination:

*a. Bromination in Sulfuric Acid.*

The process may be carried out in different ways. It is known that indigo with sulfuric acid of about seventy-eight per cent. strength forms an indigo sulfate, which on more water being added is decomposed again into sulfuric acid and indigo. The bromination may therefore take place in sulfuric acid of such concentration that indigo sulfate is still formed—for instance, sulfuric acid of seventy-eight per cent. strength or in somewhat more dilute sulfuric acid, so that the indigo sulfate formed is again decomposed into indigo and sulfuric acid. In the latter case, however, it is preferable not to use sulfuric acid essentially below fifty per cent. strength, for otherwise considerable quantities of bromo-isatin will be the result. Finally, though less advantageous, a more concentrated sulfuric acid than of seventy-eight per cent. strength may be used, care having to be taken that no sulfonation of indigo occurs. It is best, therefore, to operate with strong cooling.

Example I: One hundred and thirty-six parts, by weight, of an indigo-sulfate-sulfuric-acid paste containing one hundred and thirty-one parts of indigo (obtained by stirring indigo into sulfuric acid of seventy-eight per cent. strength) are slowly treated, while stirring at about 10° to 15° centigrade, with eighty to ninety parts of bromin. Stirring is continued until the bromin has disappeared, the mass being then introduced into water or ice.

The brominated indigo thus formed may be separated by filtration or subsequent washing. The brominated indigo obtained in this manner contained, for instance, about twenty-five per cent. of bromin and very small quantities of bromo-isatin. It is a blue powder of violet shade soluble in concentrated sulfuric acid with a yellowish-green color, which on standing turns blue. In boiling anilin the product of bromination dissolves only with great difficulty to a blue color. Pyridin dissolves it likewise, only very sparingly, amyl-alcohol not at all, and nitrobenzene somewhat when in a state of ebullition with a blue color.

Example II: To obtain higher brominated products, the operation is the same as in Example I. Only one hundred and forty to one hundred and sixty parts of bromin, for instance, are allowed to run in. The product of bromination obtained from one hundred and forty or one hundred and sixty parts of bromin dyes even clearer than that obtained from ninety parts of bromin. The product obtained from one hundred and forty parts of bromin contained, for instance, about thirty-two per cent. of bromin. It is a blue powder of violet shade and dissolves in sulfuric acid to a bluish-green color, which on standing turns into blue. Its behavior toward anilin, pyridin, amyl-alcohol, and nitrobenzene is the same as that described in Example I. Very good results are also obtained with somewhat-diluted sulfuric acid—for instance, of about seventy per cent. strength, still capable of forming indigo sulfate. Moreover, small quantities of hydrobromic acid, ($NaBr, FeBr_2$,) &c., may be added to the sulfuric acid to start the bromination. This addition, however, is not necessary if the bromin is introduced slowly. The quantity of sulfuric acid to be employed may vary according to requirement and apparatus.

Example III: In a suitable vessel one hundred and thirty-one parts of sulfate (obtained by filtration on asbestos of the indigo-sulfate-sulfuric paste) are mixed with alkali sulfate or gravel or some other mechanically-acting diluent permitting of stirring or grinding, one hundred and forty parts of bromin vapor or gas being then gradually added. The mass is then further worked as described in Example I.

*Bromination in More Dilute Sulfuric Acid, so that no Indigo Sulfate Can Exist.*

Example IV: 35.2 parts of indigo are introduced into three hundred parts of sulfuric acid of seventy-eight per cent., so that a uniform indigo-sulfate paste is formed. The mixture is then slowly diluted with about ninety to one hundred and ten parts of water or dilute hydrobromic acid, when the indigo sulfate mostly decomposes into finely-divided indigo and sulfuric acid, whereupon forty-two parts of bromin are gradually introduced with stirring. If after stirring for some time the bromin has completely disappeared, the liquid is then poured into water, fitered, and washed.

Example V: If a less brominated product is to be obtained in the manner described in Example IV, then correspondingly less bromin—for instance, fifteen, twenty, twenty-four, &c., parts of it—are employed, when the product obtained will contain more or less unchanged indigo. Instead of dilute sulfuric acid also a mixture of acid alkali sulfates with sulfuric acid may be used, or, though less advantageous, a mixture of acid alkali sulfates alone with little water or a mixture of sulfuric and hydrobromic acid or hydrochloric acid.

*b. Bromination in Hydrochloric or Hydrobromic Acid and Fluoric Acid.*

Example I: One hundred and thirty-one parts of finely-divided indigo are stirred together with about six hundred parts of concentrated hydrochloric acid of thirty-six-per-cent. strength, about ninety parts of bromin being gradually added at 10° to 15° centigrade while cooling and stirring. When all bromin has disappeared, the mixture is diluted with water, filtered, and washed. Instead of concentrated hydrochloric acid, for instance, hydrochloric acid of thirty per cent. may be employed, when it is better, however, to use less liquid.

Example II: In the above example for hydrochloric acid may be employed, for instance, hydrobromic acid of about forty-per-cent. strength or more or fluor acid, the operation being otherwise the same.

Example III: To obtain higher brominated products, the process is conducted, for instance, as follows: One hundred and thirty-one parts of indigo are well stirred with five hundred parts of concentrated hydrochloric acid, one hundred and forty to one hundred and sixty parts of bromin being run in at 10° to 15° centigrade with stirring and cooling. Carriers, such as $FeCl_2$, may also be added. When the bromination is complete, the process is continued as described in Example I.

*c. Bromination in Little Water. With Bromination in Little Water it is Best to Employ Solid or Liquid Diluents.*

Example I: One hundred and seventy-six parts of finely-divided indigo are stirred with fifty parts of water, two hundred and twenty parts of bromin, preferably in the form of gas, being allowed to gradually act thereon. Cooling will have to be recurred to if the bromin is not introduced very slowly. The moist indigo may also be stirred with indifferent agents—such as gravel, benzene, &c.—to permit of better stirring or mixing. On completion of the reaction the mixture is stirred with water or ammonia or with a liquid of alkalin reaction. It is then filtered and dried.

If less bromin than stated is employed—for instance, one hundred parts of bromin—a less brominated product will be obtained.

The brominated indigoes obtained according to a, b, and c resemble in their tinctorial properties those obtained by dry bromination as set forth in German Patent No. 128,575; but whether they are identical with the latter or with that obtained synthetically—for instance, from indoxyl, &c. (di-bromo indigo)—could hitherto not be observed.

Of course the hydrogen bromid formed during the substitution may be used again for the substitution. Thus the whole of the bromin employed during the process of substitution may be utilized, even in a single operation, by liberating the bromin from the hydrogen bromid formed by means of known agents—for example, by adding a hypochlorite, a chlorate, or a bromate—preferably by previously adding a little hydrochloric acid; also, for instance, by carefully introducing dilute chlorin gas or a liquid containing chlorin during or after having poured in the bromin or bromate.

The bromin from the hydrogen bromid resulting from the process of substitution may also be liberated by electrolysis with or without diaphragm, the action of the electrolytical hydrogen on bromo-indigo in an acid solution being not essential provided the above-mentioned conditions are adhered to.

Having now described my invention, what I claim is—

1. The herein-described process of brominating indigo, which consists in treating indigo with bromin in the presence of an aqueous halogen acid of such concentration as to permit of the least possible formation of bromo-isatin.

2. The herein-described process of brominating indigo, which consists in subjecting a mixture of indigo and about twenty to fifty per cent. of water, to the action of bromin, whereby aqueous hydrobromic acid is formed, and subjecting said indigo to the action of said hydrobromic acid.

In testimony that I claim the foregoing as my invention I have signed my name in presence of two subscribing witnesses.

ALBRECHT SCHMIDT.

Witnesses:
 ALFRED BRISBOIS,
 JOHANN HARTENSTEIN.